P. R. BASSETT.
GLASS FRONT FOR SEARCHLIGHTS.
APPLICATION FILED APR. 20, 1918.
1,403,889.
Patented Jan. 17, 1922.
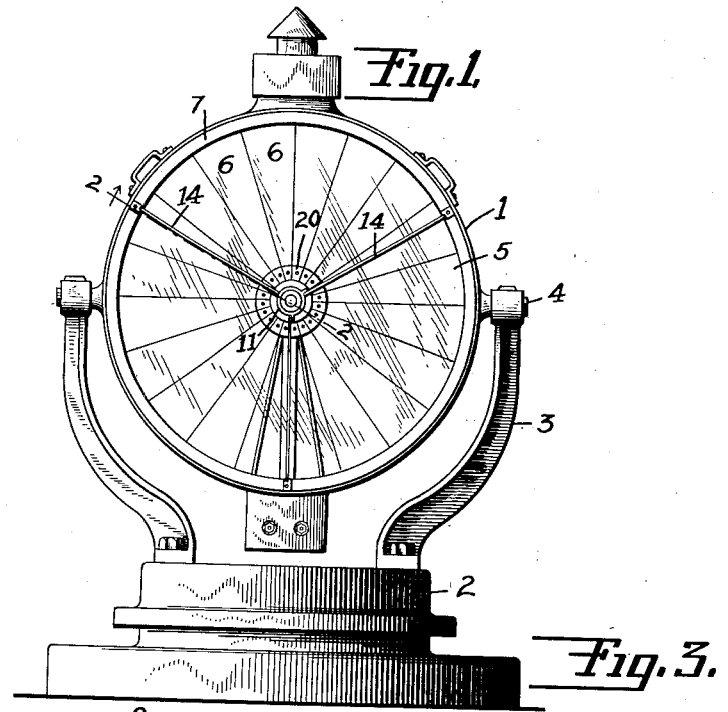
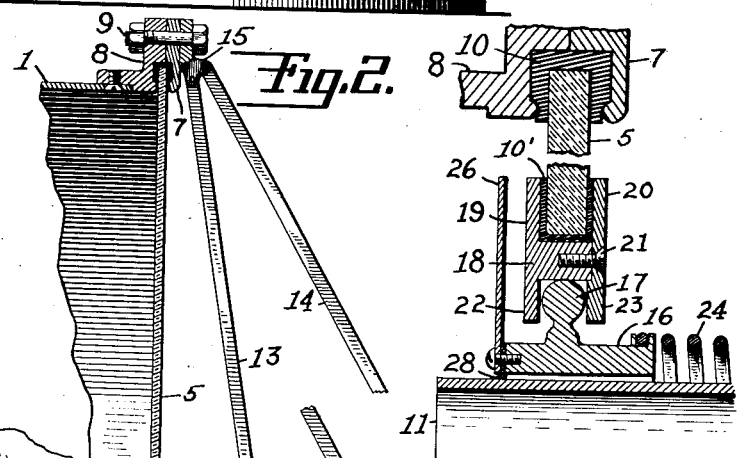
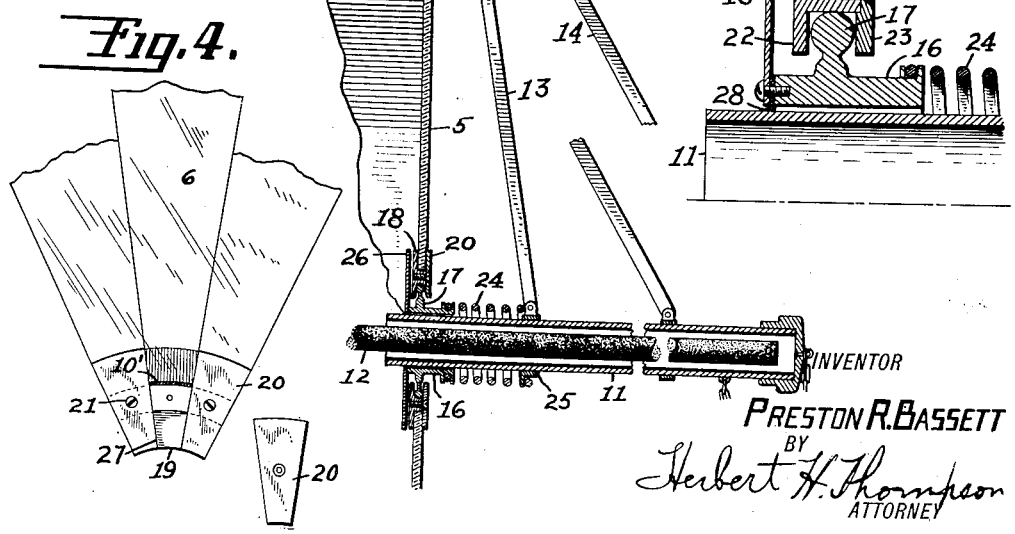
INVENTOR
PRESTON R. BASSETT
BY
Herbert H. Thompson
ATTORNEY

UNITED STATES PATENT OFFICE.

PRESTON R. BASSETT, OF BROOKLYN, NEW YORK, ASSIGNOR TO THE SPERRY GYROSCOPE COMPANY, OF BROOKLYN, NEW YORK, A CORPORATION OF NEW YORK.

GLASS FRONT FOR SEARCHLIGHTS.

1,403,889.  Specification of Letters Patent.  Patented Jan. 17, 1922.

Application filed April 20, 1918. Serial No. 229,724.

*To all whom it may concern:*

Be it known that I, PRESTON R. BASSETT, a citizen of the United States of America, residing at 1716 Newkirk Avenue, Brooklyn, in the county of Kings and State of New York, have invented certain new and useful Improvements in Glass Fronts for Searchlights, of which the following is a specification.

This invention relates to glass fronts for searchlights. The object is to provide a front capable of yielding to disturbing atmospheric pressures without breaking. At present great difficulty is experienced in protecting the glass fronts of searchlights against breakage on warships or in forts where heavy gun firing is taking place.

Numerous attempts have been made to overcome this objection, but without satisfactory results, so that in order to prevent the breaking of the glass during heavy firing, it is necessary to dismantle the searchlight by removing the front, or to close a shutter over the outside of the glass to shield it from the disturbed atmosphere. This practice however, renders it impossible to use the searchlights and big guns simultaneously on battleships or elsewhere. The present invention is designed to enable the glass to withstand the concussion caused by the firing of the guns, so that the searchlights on war ships and in forts may be kept constantly upon the target when desired even during the moment of discharging the guns.

I have found that where the ordinary straight strips of glass are mounted in a circular frame which is resiliently mounted on the drum of the searchlight by a plurality of springs, the shock is not absorbed rapidly enough to prevent the breaking of the glass; while, according to my invention but one spring is sufficient to supply the necessary resiliency, and this spring may be made weak enough to yield readily when a sudden shock is applied to the glass, and yet strong enough to return and normally hold the glass in its proper place. Also the strips of glass are much shorter when constructed in accordance with my invention than when made according to the existing practice, so that each piece is more rigid and capable of withstanding a greater shock.

Referring to the drawings wherein I have shown what I now consider to be the preferred form of my invention.

Fig. 1 is a front elevation of a searchlight embodying my invention.

Fig. 2 is a sectional view taken on line 2—2 of Fig. 1.

Fig. 3 is a detail showing the manner of attaching the glass to the searchlight.

Fig. 4 is an additional detail thereof.

In the drawings the searchlight drum is shown at 1, mounted on base 2 by means of uprights 3 and trunnions 4. The front 5 which comprises a plurality of sector shaped pieces of glass 6, is shown as engaged adjacent to its periphery by rings 7 and 8 clamped together by bolts 9. The inner ring 8 may be secured to the drum, and as shown, forms the front frame piece thereof. Any suitable packing 10, (Fig. 3) may be provided between the glass 5 and rings 7 and 8.

Through the center of the front of the searchlight is a tube 11 through which the electrode 12 is inserted. The said tube may be supported rigidly in this position by brackets 13 and 14, secured at 15 to the front of the searchlight. Loosely mounted on tube 11 is a sleeve or hub member 16 having annular projection 17 thereon.

A member 18 comprising two parts 19 and 20 fastened together by screw 21, may be clamped over the inner end of each sector 6 of glass; packing 10' being provided to prevent metallic contact with the glass. The said members 18 are adapted to engage between flanges 22 and 23 the projection 17 on collar 16.

A spring 24 is shown secured at one end to sleeve 16 and at the other to collar 25 fixed on tube 11, and adapted to hold sleeve 16 normally in the centralized position shown in Fig. 2, so that all of the sectors 6 comprising the glass front will lie in the same plane.

It will be readily apparent that when the guns are discharging or shells exploding, the sudden pressure of air against the glass will cause the glass to move against the pressure of spring 24 which will absorb the shock.

It will also be apparent that the rings 7 and 8 and packings 10 embrace the sectors 6 of glass in such a manner as to readily permit the slight pivotal movement of the glass therein, while the packing 10 and 10' will act as a shock absorber as between the glass and the metal so as to further remove the danger of breakage.

It is the usual practice to provide searchlights with opaque shutters to cut off the light when desirable. Where such shutters are not adapted to prevent leakage of light around the tube 11, separate means may be provided for this purpose. In this connection I have shown a shield 26 attached to sleeve 16 and adapted to cover the several members 18 to prevent leakage of light through cracks therebetween. Suitable packing 28 may be provided to prevent the passage of light between sleeve 16 and tube 11.

In accordance with the provision of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention what I claim and desire to secure by Letters Patent is:

1. In combination, a searchlight drum, a front therefor comprising a plurality of closely fitting sectors of glass having their points cut off so as to form an opening through the center of said front, a tube protruding through said opening, means for securing said tube to said drum, a sleeve movably mounted on said tube, means for resiliently connecting the edges of said sectors adjacent said opening to said sleeve and a resilient connection between said tube and said sleeve for holding all of said sectors normally in the same plane.

2. In combination, a searchlight drum, a frame adjacent the front end thereof, a relatively movable hub member centrally positioned with respect to said frame, a plurality of pieces of glass supported by said frame and said member and resilient means for holding said member in place.

3. In combination, a searchlight drum, an annular frame attached thereto, a relatively movable hub member centrally located with respect to said frame, resilient means for holding said member in a predetermined position, a plurality of pieces of glass supported by said frame and said hub portion and shock-absorbing material between said frame and said glass and also between said hub member and said glass.

4. In combination, a searchlight drum, an annular member secured adjacent the front end of the drum, an electrode supporting tube centrally located with respect to said annular member, means for supporting said tube from said drum, a hub member on said tube, and a plurality of sector-shaped pieces of glass extending between and supported by said annular member and said hub member.

5. In combination, a searchlight drum, an annular member secured adjacent the front end thereof, a member 11 centrally located with respect to said annular member, means for supporting said centrally located member from said drum, a hub member on said central member, resilient means connecting said hub to said central member, and a plurality of sector-shaped pieces of glass extending between and supported by said annular member and said hub member.

In testimony whereof I have affixed my signature.

PRESTON R. BASSETT.